(12) United States Patent
Kitazato

(10) Patent No.: US 7,657,267 B2
(45) Date of Patent: Feb. 2, 2010

(54) RECEIVING APPARATUS AND METHOD, INFORMATION DISTRIBUTION METHOD, FILTERING AND STORING PROGRAM, AND RECORDING MEDIUM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 646 days.

(21) Appl. No.: 10/174,666

(22) Filed: Jun. 18, 2002

(65) Prior Publication Data

US 2003/0004884 A1 Jan. 2, 2003

(30) Foreign Application Priority Data

Jun. 20, 2001 (JP) ............... 2001-186315

(51) Int. Cl.
*H04Q 7/20* (2006.01)
(52) U.S. Cl. ................. 455/456.3; 455/414.3
(58) Field of Classification Search ................. 705/14; 455/456.3; 725/91, 33; 348/723
See application file for complete search history.

(56) References Cited

U.S. PATENT DOCUMENTS

| | | | | |
|---|---|---|---|---|
| 5,740,549 A | * | 4/1998 | Reilly et al. | ................. 705/14 |
| 5,790,935 A | * | 8/1998 | Payton | ................. 725/91 |
| 5,915,243 A | * | 6/1999 | Smolen | ................. 705/14 |
| 6,373,534 B1 | * | 4/2002 | Yasuki et al. | ............... 348/725 |
| 6,496,896 B1 | * | 12/2002 | Inoue | ........................ 710/306 |
| 6,519,571 B1 | * | 2/2003 | Guheen et al. | ............... 705/14 |
| 6,778,222 B2 | * | 8/2004 | Hirai et al. | .................. 348/461 |
| 6,834,195 B2 | * | 12/2004 | Brandenberg et al. | .... 455/456.3 |
| 6,931,198 B1 | * | 8/2005 | Hamada et al. | ............... 386/46 |
| 6,951,030 B2 | * | 9/2005 | Hirai et al. | ..................... 725/33 |

OTHER PUBLICATIONS

Patent Abstracts of Japan, Publication No. 10-075219, published Mar. 17, 1998.
Patent Abstracts of Japan, Publication No. 2000-333154, published Nov. 30, 2000.
Patent Abstracts of Japan, Publication No. 2001-119312, published Apr. 27, 2001.

* cited by examiner

*Primary Examiner*—Evens J Augustin
(74) *Attorney, Agent, or Firm*—Frommer Lawrence & Haug LLP; William S. Frommer; Paul A. Levy

(57) ABSTRACT

It is possible for the content distribution side to control the conditions of target viewers for distributions without depending on the functions specific to a receiver. Content which is broadcast, a content profile, and a program are received. In an initial step of the program, prestored viewer profile information is read. All the content profiles and the contents are downloaded temporarily. Next, the profile information is read, and then a process of matching the profile information with the viewer profile information is performed. When it is determined that they do not match, a matching process for the next content profile is performed. If, on the other hand, they match, at the next step, the content is stored. The viewer reproduces the stored content at an appropriate time.

22 Claims, 10 Drawing Sheets

RECEIVING APPARATUS AND METHOD, INFORMATION DISTRIBUTION METHOD, FILTERING AND STORING PROGRAM, AND RECORDING MEDIUM

BACKGROUND OF THE INVENTION

1. Field of the Invention

The present invention relates to a receiving apparatus and method, an information distribution method, a filtering and storing program, and a recording medium, which can be applied to, for example, a cumulative-receiving-type digital broadcasting system.

2. Description of the Related Art

Hitherto, among methods which have already been put into practical use in broadcast media, a method of filtering content which is distributed according to attributes and preferences of a viewer in order to store only the content which matches those of the viewer does not exist. As a method which has been used in practice, there is a method in which genre information is added to program information for an EPG (Electronic Program Guide), the program information is filtered according to the genre information preferred by the viewer, and recommended programs are then provided to the viewer. However, since such a method is not a method of filtering the content itself, some work is necessary for the viewer to select a desired program from a displayed list of recommended programs. Furthermore, for a broadcaster such as a broadcasting station, the probability that a target viewer watches the content which is provided becomes low. In addition, since the content is in program units, there is another problem in that filtering in units of data content, which is a subdivision unit, cannot be performed.

Recently, the specification of a new broadcasting system, in which a storage device such as a hard disk is provided, content is acquired from a broadcast, the Internet, etc., the content is stored in a storage device, and a viewer watches a desired program at a desired time, is being formulated by the "TV Anytime Forum", which is a standardization organization. In the "TV Anytime" specification, a model of filtering and storing in content units is assumed. Here, a model is assumed in which attribute information, such as the genre of the content, is transmitted as meta data, and on the receiving side, content which matches a user profile is filtered by a process of matching a set user profile with the attribute information.

The algorithm of the filtering proposed earlier depends strictly on the functionality at the receiver side. In other words, since filtering is specific to the receiver maker, it is considered to be difficult to manage for a broadcaster which desires that filtering be widely performed in the unified manner for assumed target viewers. For example, in a case where direct mail is to be distributed by a broadcast, there is a problem in that it is not possible to distribute direct mail to a sufficient number of persons.

SUMMARY OF THE INVENTION

Accordingly, an object of the present invention is to provide a receiving apparatus and method, an information distribution method, a filtering and storing program, and a recording medium, which are capable of setting viewers as distribution targets without depending on the functionality of the individual receivers.

To achieve the above-mentioned object, in one aspect, the present invention provides a receiving apparatus in an information distribution system made up of a customer management center and receiving apparatuses, which receive distributed content, including a content distribution apparatus and content storage means, the receiving apparatus comprising: means for inputting viewer profile information in accordance with a viewer profile setting program, storing the input viewer profile information, and transmitting the viewer profile information to the customer management center; means for receiving content, profile condition information of target viewers of the content, and a filtering and storing program, and executing the filtering and storing program so that a process of matching the stored viewer profile information with the profile condition information is performed, and matched content is filtered and stored in the content storage means; and means for reproducing the stored content.

In another aspect, the present invention provides a receiving apparatus in an information distribution system made up of a customer management center and receiving apparatuses, which receive distributed content, including a content distribution apparatus and content storage means, the receiving apparatus comprising: means for inputting viewer profile information in accordance with a viewer profile setting program, storing the input viewer profile information, and transmitting the viewer profile information to the customer management center; means for receiving and storing content, profile condition information of target viewers of the content, and a filtering and storing program, and executing the filtering and storing program so that a process of matching the stored viewer profile information with the viewer profile condition information is performed, and matched content within the stored content is filtered and stored in the content storage means; and means for reproducing the stored content.

In another aspect, the present invention provides a receiving method in an information distribution system made up of a customer management center and receiving apparatuses, which receive distributed content, including a content distribution apparatus and content storage means, the receiving method comprising: a step of inputting viewer profile information in accordance with a viewer profile setting program, storing the input viewer profile information, and transmitting the viewer profile information to the customer management center; a step of receiving content, profile condition information of target viewers of the content, and a filtering and storing program, and executing the filtering and storing program so that a process of matching the stored viewer profile information with the profile condition information is performed, and matched content is filtered and stored in the content storage means; and a step of reproducing the stored content.

In another aspect, the present invention provides a receiving method in an information distribution system made up of a customer management center and receiving apparatuses, which receive distributed content, including a content distribution apparatus and content storage means, the receiving method comprising: a step of inputting viewer profile information in accordance with a viewer profile setting program, storing the input viewer profile information, and transmitting the viewer profile information to the customer management center; a step of receiving and storing content, profile condition information of target viewers of the content, and a filtering and storing program, and executing the filtering and storing program so that a process of matching the stored viewer profile information with the profile condition information is performed, and matched content within the stored content is filtered and stored in the content storage means; and a step of reproducing the stored content.

In another aspect, the present invention provides an information distribution method in an information distribution system made up of receiving apparatuses including a content distribution apparatus and content storage means, which receive distributed content, and a customer management center, the information distribution method comprising the steps of: referring to viewer profile information which is input by a receiving apparatus and which is stored in the customer management center in order to set profile condition information so that target viewers for distributions are set; and distributing, to the receiving apparatus, content, the set profile condition information, and a filtering and storing program containing a process of matching the viewer profile information with the profile condition information.

In another aspect, the present invention provides an information distribution method in an information distribution system made up of a customer management center and receiving apparatuses, which receive distributed content, including a content distribution apparatus and content storage means, the information distribution method comprising: a step in which the receiving apparatus inputs viewer profile information, stores the input viewer profile information, and transmits the viewer profile information to the customer management center; a step in which the customer management center receives the viewer profile information input by the receiving apparatus and provides the stored viewer profile information to a content distribution apparatus; a step in which the content distribution apparatus sets viewer profile information by referring to the provided profile condition information in order to set target viewers for distributions, and distributes content, the set profile condition information, and a filtering and storing program; and a step in which the receiving apparatus receives content, the profile condition information, and the filtering and storing program, and executes the filtering and storing program so that a process of matching the stored viewer profile information with the profile condition information is performed, matched content is filtered and stored in the content storage means, and the stored content is reproduced.

In another aspect, the present invention provides an information distribution method in an information distribution system made up of a customer management center and receiving apparatuses, which receive distributed content, including a content distribution apparatus and content storage means, the information distribution method comprising: a step in which the receiving apparatus inputs viewer profile information, stores the input viewer profile information, and transmits the viewer profile information to the customer management center; a step in which the customer management center receives the viewer profile information input by the receiving apparatus and provides the stored viewer profile information to the content distribution apparatus; a step in which the content distribution apparatus sets profile condition information by referring to the provided viewer profile information in order to set target viewers for distributions, and distributes content, the set profile condition information, and a filtering and storing program; and a step in which the receiving apparatus receives and stores content, the profile condition information, and the filtering and storing program, and executes the filtering and storing program so that a process of matching the stored viewer profile information with the profile condition information is performed, matched content within the stored content is filtered and stored in the content storage means, and the stored content is reproduced.

In another aspect, the present invention provides a filtering and storing program for making a computer of a receiving apparatus in an information distribution system made up of a customer management center and receiving apparatuses, which receive distributed content, including a content distribution apparatus and content storage means perform for each content: a step of receiving content and profile condition information of target viewers of the content; a step of reading viewer profile information which is input in advance and stored; a step of performing a process of matching the profile condition information with the viewer profile information in order to determine whether or not they match; and a step of storing the content in the content storage means when they match and of not storing the content when they do not match.

In another aspect, the present invention provides a filtering and storing program for making a computer of a receiving apparatus in an information distribution system made up of a customer management center and receiving apparatuses, which receive distributed content, including a content distribution apparatus and content storage means center perform for each content: a step of receiving the content and profile condition information of target viewers of the content; a step of reading viewer profile information which is input in advance and stored; a step of performing a process of matching the profile condition information with the viewer profile information in order to determine whether or not they match; and a step of accessing another content which exists at a specific location on a communication network, described in the content when they match and of storing or reproducing the other content.

In another aspect, the present invention provides a computer-readable recording medium having recorded thereon a filtering and storing program for making a computer of a receiving apparatus in an information distribution system made up of a customer management center and receiving apparatuses, which receive distributed content, including a content distribution apparatus and content storage means perform for each content: a step of receiving content and profile condition information of target viewers of the content; a step of reading the viewer profile information which is input in advance and stored; a step of performing a process of matching the profile condition information with the viewer profile information in order to determine whether or not they match; and a step of storing the content in the content storage means when they match and of not storing the content when they do not match.

In another aspect, the present invention provides a computer-readable recording medium having recorded thereon a filtering and storing program for making a computer of a receiving apparatus in an information distribution system made up of a customer management center and receiving apparatuses, which receive distributed content, including a content distribution apparatus and content storage means perform for each content: a step of receiving content and profile condition information of target viewers of the content; a step of reading the viewer profile information which is input in advance and stored; a step of performing a process of matching the profile condition information with the viewer profile information in order to determine whether or not they match; and a step of accessing another content which exists at a specific location on a communication network, described in the content when they match and of storing or reproducing the other content.

In the present invention, viewer profile information is input in advance, the viewer profile information is stored in the receiving apparatus, and the viewer profile information input to the customer management center is formed into a database. Profile condition information for specifying target viewers to whom content is desired to be distributed is transmitted together with the content. In the receiving apparatus, a process of matching the viewer profile information with the profile condition information is performed, and matched content is stored. Furthermore, a filtering and storing program is distributed, and the receiving apparatus performs filtering in accordance with the received content storing program. Therefore, since filtering is performed without depending on the specific functionality of the receiving apparatus, it is possible for the side which distributes the content to control the condition of the viewer to whom content is desired to be distributed.

According to the present invention, in a standard digital television receiver having a storing function and a data broadcast reproduction/presentation function, since a content profile used for a process of matching with the profile information of the viewer is transmitted, filtering and storage of information content based on the viewer profile can be realized. As a result, effective distribution of information content targeted at a specific target class becomes possible. For example, direct mail can be distributed effectively.

Furthermore, as a method of filtering based on a viewer profile, a method has been proposed in which meta data of attribute information, such as a genre, is added to the content and then transmitted, and in which desired content is filtered based on the function set by individual receivers. In comparison with this method, the method of the present invention has the advantage of being capable of being widely used in receivers having a basic function without depending on the receiver, and furthermore, the advantage of being capable of controlling the condition of viewers to whom content is desired to be distributed in a unified manner.

In addition, the present invention makes it possible to make the distribution of information content by a broadcast and the distribution of information content by Internet access coexist or to be used in different ways, yielding the advantage that more efficient management can be performed.

DESCRIPTION OF THE PREFERRED EMBODIMENTS

An embodiment of the present invention will be described below. The embodiment can be applied to a case in which direct mail, flyers, etc., which are converted into electronic form and then converted into multimedia, are distributed to target viewers. Various information providers set the attributes of customers who, the providers think, desire to receive the information which the providers want to transmit. The information providers broadcast the information through a broadcasting station and cause the information to be stored in a storage device of a receiver of a targeted customer by means of a particular scheme. For the customer, information appropriate for one's preferences and requirements is stored in the customer's receiver without the customer taking any particular action. The customer is informed of the fact that the information is stored, and reproduces and browses this information. The information such that the viewer has browsed specific information is counted up in a customer management/transaction center on the communication network through an uplink, and the information is fed back to the information provider. The platform dealer managing this scheme charges each information provider according to the number of times each customer browses, and can obtain an income. In the following description, for the sake of convenience, such broadcasting services according to the present invention will be referred to as "d-mail services" (meaning direct-mail services).

Figure 1:
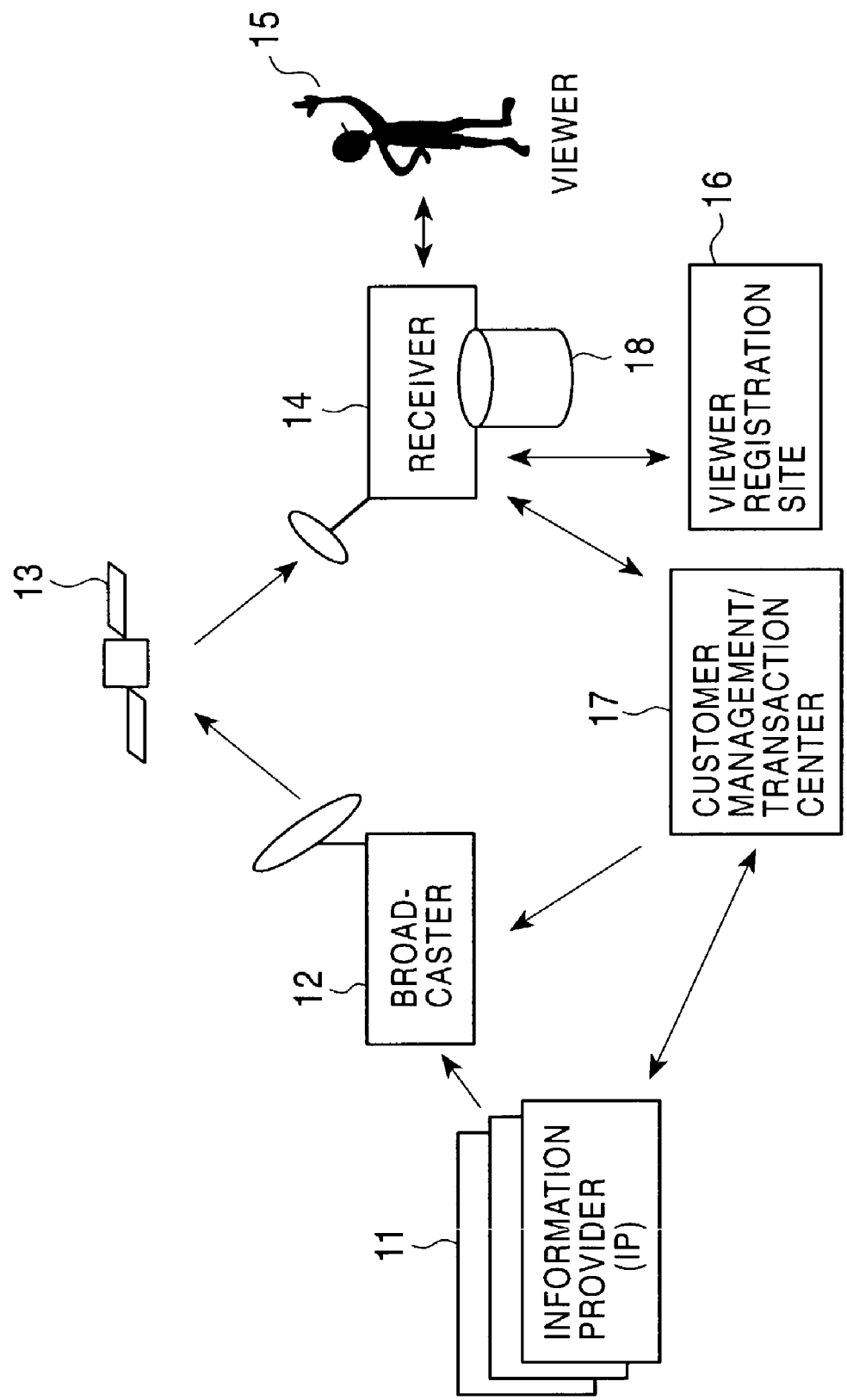
FIG. 1 is a block diagram showing the configuration of the overall system according to an embodiment of the present invention.

FIG. 1 shows the configuration of the overall system of an embodiment of the present invention. Reference numeral 11 denotes an information provider. The information provider 11 is, for example, a direct mail forwarder. The information provider 11 passes to a broadcaster 12 the information of the content which is desired to be distributed. The broadcaster 12 distributes programs via a broadcast or communication satellite 13. Reference numeral 14 denotes a receiver, and reference numeral 15 denotes a viewer of broadcast services. The receiver 14 comprises a storage device 18 such as a hard disk, so that filtered content can be stored in the storage device 18.

The flow of processes over time on the system shown in FIG. 1 will be described. In the initial process, in order to receive the provision of the d-mail service, the viewer 15 of the broadcasting services accesses, for example, a Web site (viewer registration site) 16 dedicated to the relevant service on the Internet through an uplink (communication line) from the receiver 14, and performs viewer registration and inputs viewer profile (preference) information. The program for inputting the viewer program information is provided to the receiver 14 from the site 16. The viewer 15 who has performed viewer registration and inputting of a viewer profile is treated as having concluded a contract for receiving d-mail services. The cost required for the viewer 15 to receive the provision of the d-mail services is free or is set at a relatively low price.

When viewer information is to be input, access is made to a commonly called BML (Broadcast Markup Language) document by a multimedia coding method called, for example, BML, in accordance with the HTML (HyperText Markup Language) protocol. In the BML browser function of this receiver 14, by executing a BML document, the viewer 15 is requested to input registration information to be set and profile information. As a result of completing the input of these pieces of information, a customer ID is assigned, and the customer ID and the profile information are stored as viewer profile information in the receiver 14, and at the same time, these are sent to the customer management/transaction center 17, where they are managed. Furthermore, the viewer can set a receiving reservation (reservation at the receiving date and time, the channel to be received, etc.), by which data, such as content distributed by the d-mail service, is stored in the receiver 14 in advance.

However, it is also possible to transmit data necessary for d-mail service through a channel on which a normal television program is broadcast rather than through a channel dedicated to the d-mail service.

In the second process, the information provider 11 creates, as multimedia content, information which is desired to be sent to a viewer group having specific attributes. In Japan, for example, a BML document content is created. For example, a pizza advertisement flyer is created in a form in which an order can be placed. At the same time, the information provider 11 sets profile condition information (hereinafter referred to as a "content profile" as necessary) represented by a conditional equation based on the above-described viewer profile information.

In this case, the information provider 11 can access the customer management/transaction center 17 and can determine the approximate total number of viewers matching the set profile conditions from the viewer profile database within a server at the customer management/transaction center 17. This makes it possible for the information provider 11 to check whether or not effects commensurate with the effort spent to originate information can be obtained. As a result, it is possible for the information provider 11 to adjust the content profile so that an appropriate number of target viewers is reached. That is, when the number of viewers is too small, since there is a risk that the advertisement effects become small, the context profile is relaxed. In contrast, when the number of viewers is too large, since the cost becomes high, the content profile is made more strict.

In the third process, the broadcaster 12 receives information content and a content profile from a plurality of information providers 11 in order to manage daily services. The broadcaster 12 assigns, for each content, a content ID for management. Furthermore, a filtering and storing program for causing a filtering and storing operation to be performed in the receiver 14 is formed as a script file, and a schedule is created so that the script file can be broadcast together with the information content and the content profile. The script file is created as a BML document. Basically, this script file containing the same contents can be used. The content, the content profile, and the script file for the filtering and storing program are broadcast as a packet stream by a repeated transmission method called a "data carousel". Broadcasting management is broadly classified into two management methods: linked-type management and independent-type management, which will be described later.

Figure 2:
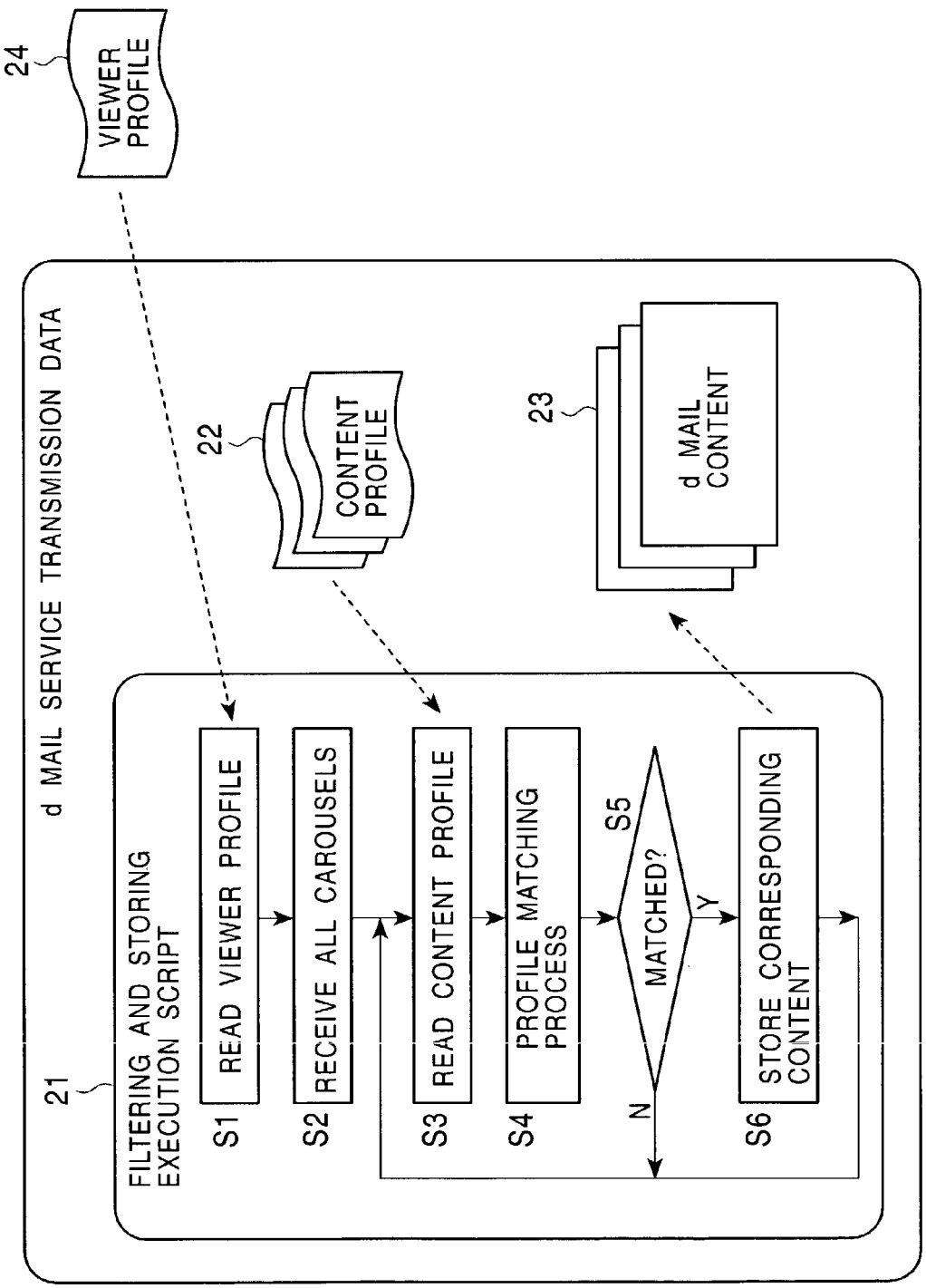
FIG. 2 is a flowchart illustrating transmission data and processes of a receiver according to the embodiment of the present invention.

In the fourth process, the receiver 14 receives the above-described group of files of the broadcast data carousel. The flow of this receiving process is shown in FIG. 2. The receiver 14 receives, as d-mail service transmission data, context 23, a context profile 22, and a filtering and storing program (filtering and storing execution script) 21. The content profile 22 and the content 23 are associated with each other by a content ID, and the same number of files is contained. The filtering and storing execution script 21 is one file.

The processing inside the receiver will be described below with reference to FIG. 2. Initially, when the receiver 14 receives the above-described data, first, the receiver 14 accesses the filtering and storing execution script 21 so that this file is activated. In order that the filtering and storing execution script 21 is performed first, a specific packet number is assigned to the script file 21. In the execution of the script, in the initial step S1, viewer profile information 24, which is stored as a file in a nonvolatile memory or a hard disk within the receiver 14, is read.

Next, all the content profiles 22 and the contents 23 are temporarily downloaded into the cache area of the receiver (step S2). Then, the profile information (viewer profile condition information) 22 for the first content is read (step S3). In step S4, a process of matching the read profile information with the viewer profile information 24 is performed.

In step S5, it is determined whether or not they match. When they do not match, the process returns to the reading of the next content profile in step S3, and a matching process for the second content profile is performed. If they match in step S5, in step S6, the corresponding content 23 is stored in a directory in the storage device indicated by the script. In this case, as a result of placing title information, with which the viewer 15 makes a list display later, in the content profile, the titles are also stored. Furthermore, the content IDs are also stored. For the second and subsequent contents, the processes from steps S3 to S6 are performed for all the information contents which are transmitted at the same time, and only the matched content is stored in the storage device 18.

In the fifth process, the viewer 15 operates the receiver 14 at an appropriate time in order to display the title list of the contents stored in the storage device 18 in the receiver 14 so that the title of the content that he/she wants to reproduce is specified. The content of the specified title is read from the storage device 18, is reproduced, and is displayed on the display device of the receiver 14. The content ID and the browsing data and time corresponding to the reproduced content are written in a log information area of the nonvolatile memory or the hard disk of the receiver 14. The above-described series of processes are possible for both the case where these processes are executed as a resident application in the receiver 14 and the case where these processes are executed by a BML document transmitted by the d-mail service.

In the sixth process, the content viewing log information stored in the nonvolatile memory or the hard disk of the receiver 14 is collectively uploaded automatically to the customer management/transaction center 17 together with the customer ID by using an uplink at an appropriate time. This uploading process is possible for both the case where this process is executed by a resident application in the receiver 14 and the case where this process is executed by a BML document transmitted by the d-mail service. It is preferable that content viewing log information be controlled so as to be sent at an appropriate uploading interval.

In an environment in which the receiver 14 is always connected to the customer management/transaction center 17, the method is not limited to a method of collectively transmitting the content viewing log, but a method of transmitting the viewing log to the customer management/transaction center 17 when the viewer browses may be used.

In the seventh process, the customer management/transaction center 17 receives viewing log information for each viewer, uploaded from the receiver 14, and basically counts, for each content ID, the total number of viewers who browsed in a predetermined period of time. The number of viewers who browsed for each content can be viewed from the information provider 11 if desired. Based on this number of viewers who browsed each content, automatic linking to a system which performs a settlement process for the platform dealer (a dealer who performs operations and management of d-mail services) is also possible. On the other hand, when the customer ID is contained in the viewing log information, by counting up and analyzing the content profile by which the content is viewed for each customer, personal information regarding the requirements of each viewer can be accumulated, making it possible to perform careful customer handling services.

Figure 3:
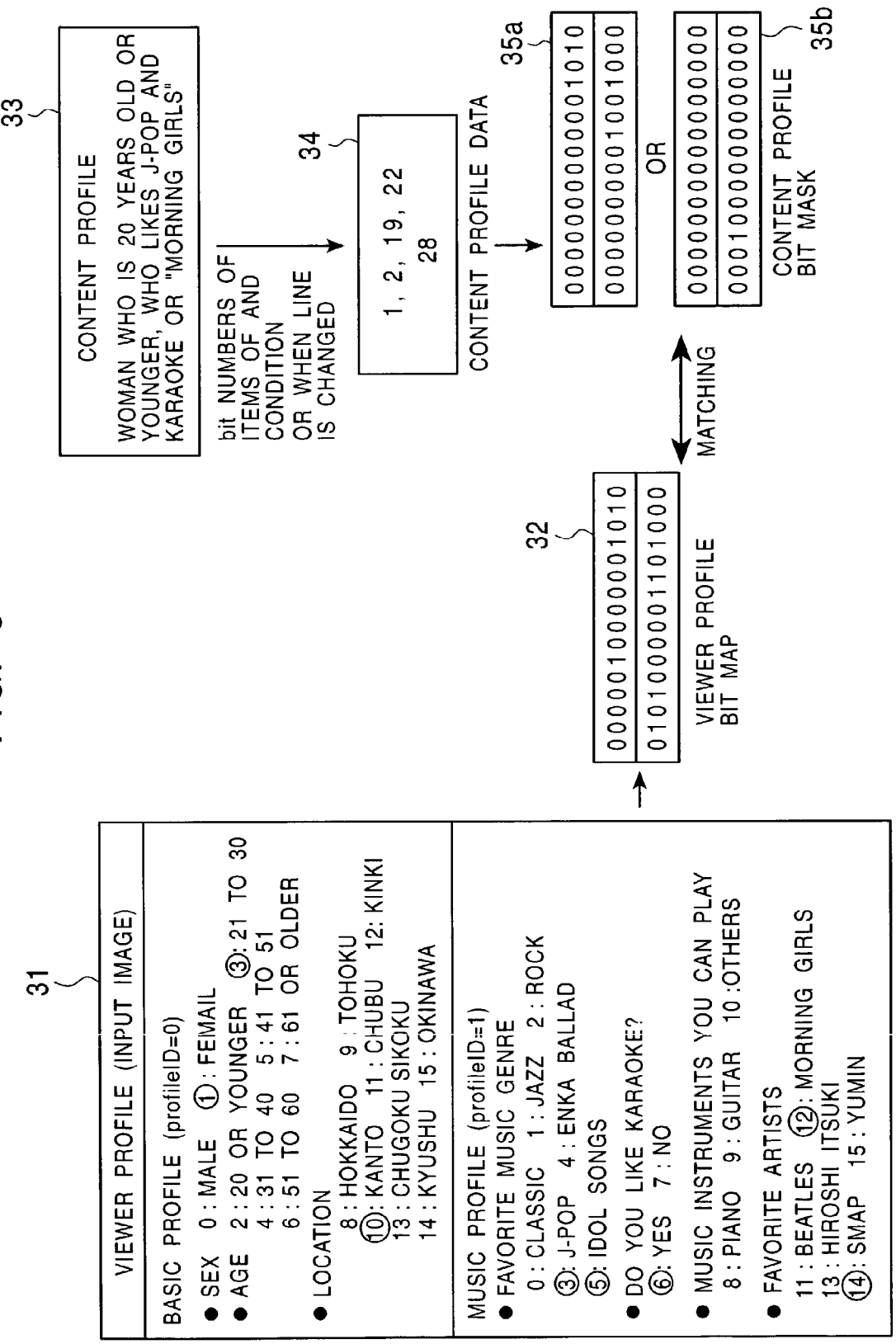
FIG. 3 is a schematic diagram illustrating a profile and a matching method according to the embodiment of the present invention.

Next, referring to FIG. 3, an example of a method of matching viewer profile information with a content profile is described. In the initial step, when viewer profile information is to be input, as an example, an input screen, such as that indicated by reference numeral 31, is used. The viewer profile is composed of a basic profile containing a set of basic viewer attributes such as addresses and ages, and several extension profiles indicating, hobbies, preferences, etc. For each of the basic profile and the extension profile, there are 16 selective input items.

The extension profile includes profiles for each field, such as music, sports, etc., and these are identified by a profile-ID. The basic profile is indicated by profile-ID=0, and the extension profile is indicated by profile-ID≧1 for each field. In the example of FIG. 3, a music profile of profile-ID=1 is shown. The extension profile is set as necessary. For example, for a user interested only in music, it is also possible to manage setting only the extension profile of the music field.

In the example of FIG. 3, an example is shown in which, as a viewer profile, only the basic profile and the music profile are set. An input screen 31 for the user (the viewer 15), as an example, forms one screen for each of the basic profile and the music profile. In this matching method, it is necessary for the user to input "Yes/No" for all the items. As an example, the circled items within the input screen 31 represent selected ones (Yes).

The inputting on this input screen 31 is performed in the above-described first process. For example, access is made to a specific Web site 16 on the Internet, and then access is made to a specific BML document therein. The BML browser of the receiver 14 displays the input screen 31 on the screen of the receiver 14 so that the viewer 15 performs an input operation by using a remote-control commander, etc., in order to input an item. The viewer profile input by the viewer 15 is stored as a file in the nonvolatile memory or the hard disk of the receiver 14.

In the matching method shown in FIG. 3, by mapping each item set to "Yes/No", using "0/1", to each bit which is assigned in a corresponding manner, the items can be stored as a bit map compressed to the minimum amount of information, as indicated by reference numeral 32. 16 bits (2 bytes) in the upper row of a viewer profile bit map 32 correspond to the set items of the basic profile of the input screen 31, and 16 bits (2 bytes) in the lower row thereof correspond to the set items of the music profile as an extension profile.

The setting "01010 . . . " is made from the lowest-order bit (the rightmost bit) of the bit map corresponding to the basic profile to the high-order side. The lowest-order bit corresponds to the "sex" of "male" of the basic profile within the input screen 31. The second lowest bit corresponds to "female" thereof. In the example of FIG. 3, since "female" is selected, these two bits are set to "01". Hereafter, in accordance with the setting of each item, each bit is set to "0" or "1". For the music profile, also in a similar manner, a viewer profile bit map is formed. For the viewer profile bit map of a total of 4 bytes, bit numbers 0 to 31 are assigned in sequence starting from the lowest-order bit.

Next, the information provider 11 which has produced specific information content sets the profile of a target viewer to whom the content is desired to be sent as a content profile in the second process in the description of the above-described flow of information over time. In FIG. 3, reference numeral 33 denotes an example of a content profile set with respect to a particular content. That is, a "viewer who is a 20-year-old woman or younger, likes Japanese pop and Karaoke, or a viewer who likes "Morning Girls"" is set as a content profile 33. In this case, the information provider sets, in a content profile input system, the profile condition of the target viewer in accordance with an AND/OR condition in an input screen similar to the viewer profile input screen 31. In this content profile input system, the input content profile is created as an AND/OR condition of each item of the viewer profile.

In this example, as indicated by reference numeral 34, the content profile data is created as data in the form of a table such that, as a viewer profile condition, the bit number of each item constituting the AND condition is expanded in the row direction, and the OR condition is expanded in the column direction. The broadcaster 12 receiving the content and the content profile data distributes the content, the content profile data, and the filtering and storing execution program in the third process in the description of the above-described flow of information over time.

Next, in the fourth process of the description of the above-described flow of information over time, a filtering and storing execution program is activated in the receiver 14, and the viewer profile data stored in the receiver 14 is read (step S1 in FIG. 2). Next, content profile data 34 is received and extracted (steps S2 and S3 in FIG. 2). At this time, for the content profile data, the AND conditional equation portion is developed from the transmission format 34 in a table form into bit map data similar to the viewer profile data, as indicated by reference numerals 35a and 35b.

Next, as a matching process in step S4 in FIG. 2, bit computation of the viewer profile bit map 32 and the content profile data 35a or 35b is performed. That is, only the bits which are set to "1" in the bit map data 35a or 35b portion corresponding to the AND conditional equation within the viewer profile bit map 32 are picked up. Then, the AND of the bits which are set to "1" and the picked-up bits is computed. When the output of the AND of all the bits is "1", it is determined that the content profile and the viewer profile match, and the determination output is set to "1". If the AND output of any one of the bits is "0", it is determined that they do not match, and the determination output is set to "0".

In addition, such a matching process is performed for each of the bit maps 35a and 35b corresponding to the AND conditional equation so that the OR of the respective matching results is computed to obtain a final matching output. That is, when at least one of the bit maps 35a and 35b matches the viewer profile bit map 32, the matching result is set to "1". On the other hand, if they do not match, the result "0" is obtained. Step S5 of FIG. 2 is a process of performing the determination of such a matching. When they match, in step S6, the corresponding content is received and is stored as a file in the hard disk.

Next, a description is given of a more detailed management mode and management method for the d-mail service according to the present invention. The outline of the flow of management as a business model, and a base example of a method of matching a content profile with a viewer profile, are as stated above, and are common to several management methods described below.

Management modes include a linked-type mode in which the d-mail service is provided at the same time as when a television broadcast program is presented, and an independent-type mode which is independent of a television broadcast program. Furthermore, in these management modes, several modifications of the management methods are possible. The management modes/management method will be described below.

Figure 4:
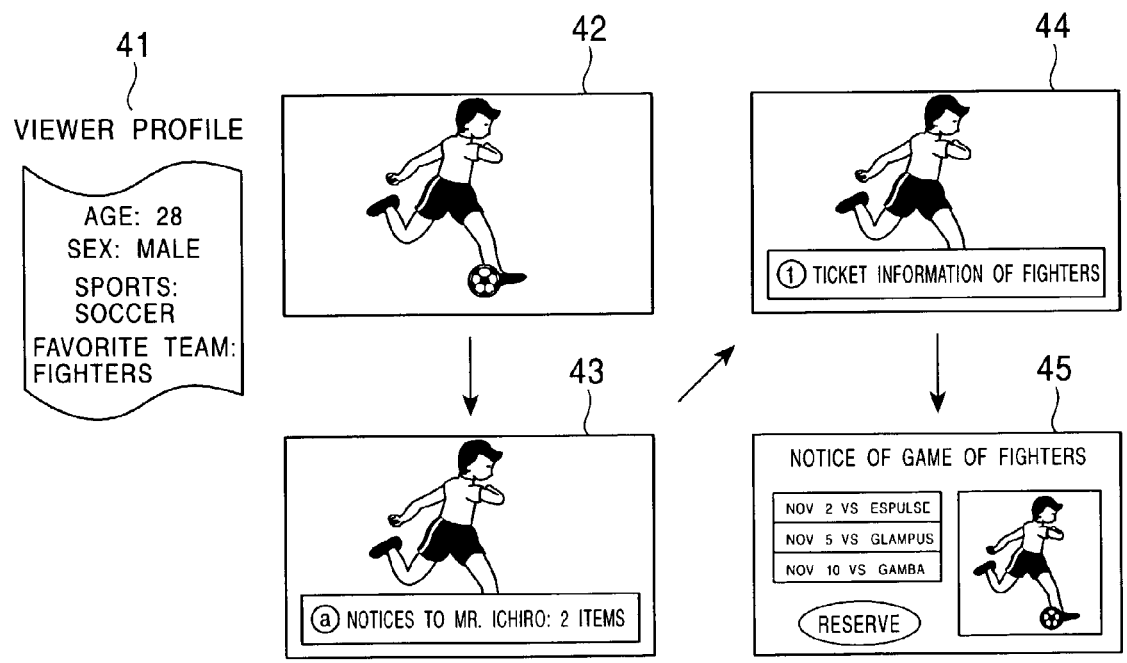
FIG. 4 is a schematic diagram of screens examples for the purpose of illustrating an example of a linked-type service according to the embodiment of the present invention.

First, referring to FIG. 4, the outline of a linked-type type management mode is described. FIG. 4 shows the management mode is described. FIG. 4 shows the transition of a television screen of a viewer. As an example, the viewer inputs a viewer profile such as that indicated by reference numeral 41, and this viewer profile 41 is recorded as a file in the storage device of the receiver 14. As an example, profile information 41 indicating "age: 28, sex: male, sports: soccer, favorite team: Fighters" is set. The profile information regarding sports is set in the extension profile.

It is assumed that, as a normal television broadcast, for example, a soccer game is being broadcast. As shown on the television screen indicated by reference numeral 42, as in an ordinary case, a broadcast program is being presented to the viewer. In this case, concurrently with the provision of the program by an AV (Audio Visual) stream, the above-described process of the fourth step (a filtering-reception and storing process of a plurality of contents, shown in FIG. 2) is being performed by the receiver 14.

When content which has matched the viewer profile 41 and which has been stored exists, after the filtering and storing execution program 21 completes all the storing processes, the filtering and storing execution program 21 causes the fact that information content appropriate for the viewer has arrived and has been stored to be presented and reported, as a message, to the viewer in such a manner as to overlap the message on the screen, as shown on the television screen indicated by reference numeral 43. Furthermore, when the viewer views the message and performs an operation, the filtering and storing execution program 21 displays the titles of the stored contents in sequence on the basis of a timer process, as shown on the television screen indicated by reference numeral 44.

Here, when the viewer performs a predetermined operation by a commander of a remote controller while a particular title is being displayed, the content is read and displayed, as shown on a television screen 45. For example, in a case where the title of the ticket information of one's favorite team of soccer is being broadcast, when a specific button operation is performed by using the commander of a remote controller, the screen changes from the screen 44 to the screen 45, and detailed information is presented. On the screen 45, a list of games and a reserve button are displayed, so that a ticket of a desired game can be reserved by a predetermined button operation of the commander.

Such a linked type is suitable mainly for the distribution of information content of a genre associated with a program. FIG. 4 shows an example of game information of the viewer's favorite team and content for which ticket reservation is possible. When the viewer does not want to interrupt the viewing of the original television program, the viewer may also memorize the arrival of such information content, so that, later, storage navigation software provided in the receiver 14 can be executed, and the content can be executed and browsed.

Figure 5:
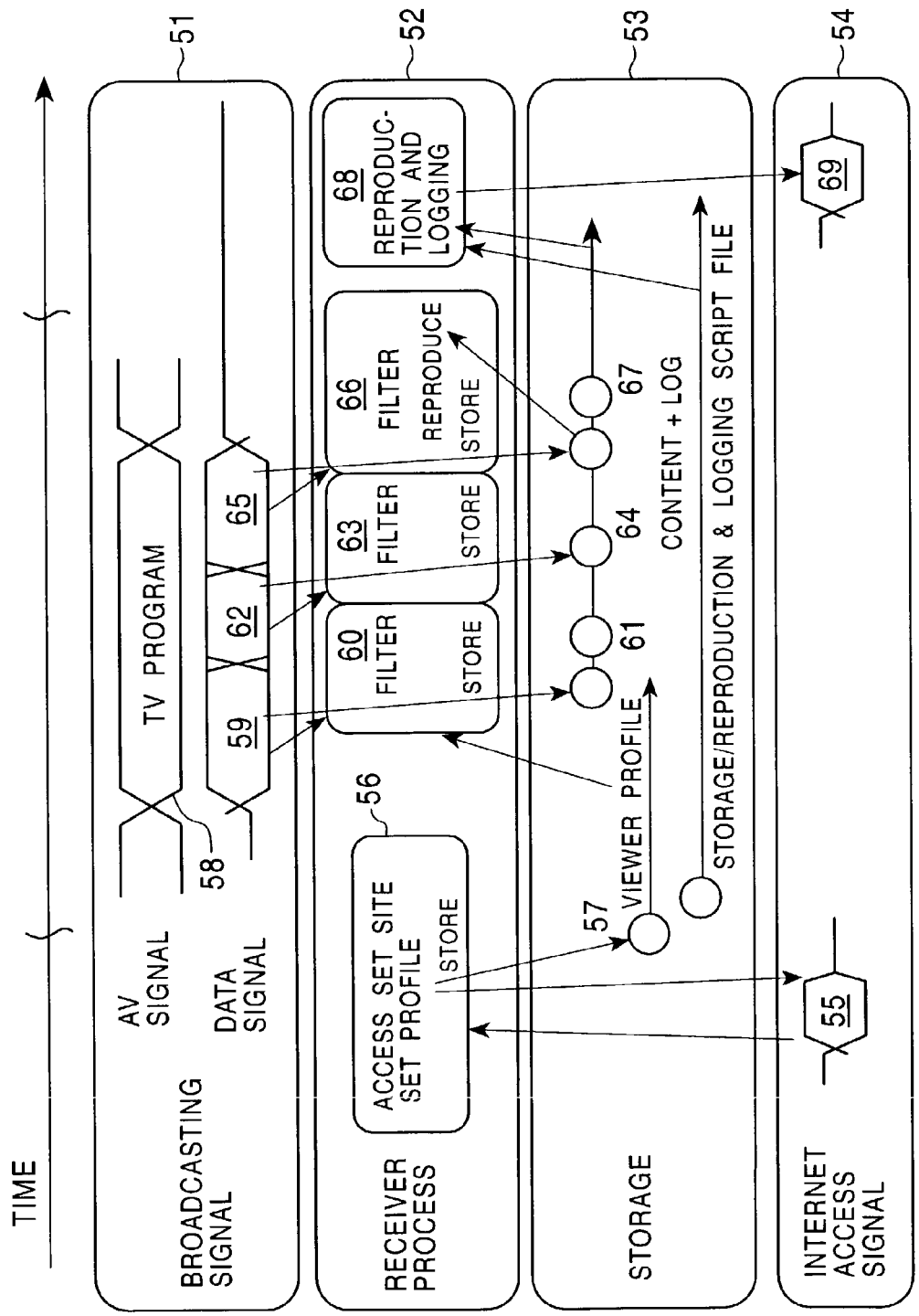
FIG. 5 is a schematic diagram showing processes over time for the purpose of illustrating an example of a linked-type service according to the embodiment of the present invention.

FIG. 5 shows a transmission signal and processes in the receiver 14 over time in the linked-type management. In FIG. 5, reference numeral 51 denotes a broadcast signal. Reference numeral 52 denotes processing within the receiver. Reference numeral 53 denotes a file within the storage device. Reference numeral 54 denotes an Internet access transaction. Furthermore, the passage of time is shown from the left to the right.

Initially, access is made to the viewer registration site 16 on the Internet from the receiver 14. The transaction is indicated by reference numeral 55. The content for viewer registration is executed within the receiver 14, and as a result of inputting by the viewer, a viewer profile is set (receiver process 56). Then, the set viewer profile is sent to the viewer registration site 16, and at the same time, the viewer profile is recorded as a viewer profile file 57 in the storage device. Furthermore, a script for reproducing the stored content and uploading a viewing log is downloaded from the viewer registration site 16 and is stored as a file in the storage device.

Thereafter, in a particular television program 58, a plurality of contents of d-mail services are repeatedly transmitted in a time slot indicated by reference numeral 59 by a data carousel method. It is common that this point in time is much later than the time when the above-described receiver process 56 is performed. In the receiver 14, as a result of executing the filtering and storing execution script received from this data carousel, in a time slot indicated by reference numeral 60, only the contents filtered by a matching process from the plurality of contents are stored as files 61 in the storage device. The circular marks in the figure conceptually show one file. In the manner described above, the presence of the stored contents is reported to the viewer in the form of a message.

Furthermore, in the example shown in FIG. 5, during a television program, the transmission of data carousels is switched so that different content sets are transmitted in time slots indicated by reference numerals 62 and 65. Other filtering and storing scripts are executed in time slots indicated by reference numerals 63 and 66, and the contents filtered at each time slot are stored as one file 64 and as two files 67 in the storage device, respectively.

Thereafter, the viewer reads and executes the script 68 for a reproduction and for uploading a viewing log at a desired time (a time slot indicated by reference numeral 68), such as the day after the program was viewed, so that the viewer selects a desired content from the stored contents and views it. Furthermore, for the viewed content, as indicated by the transaction 69, the ID information of the content is transmitted as a viewing log to the customer management/transaction center 17. The reason why reproduction and logging are performed at the same time is that an environment is possible in which always-on connections to the Internet can be made. When otherwise, the reproduction log is collectively sent periodically as once every month.

Figure 6:
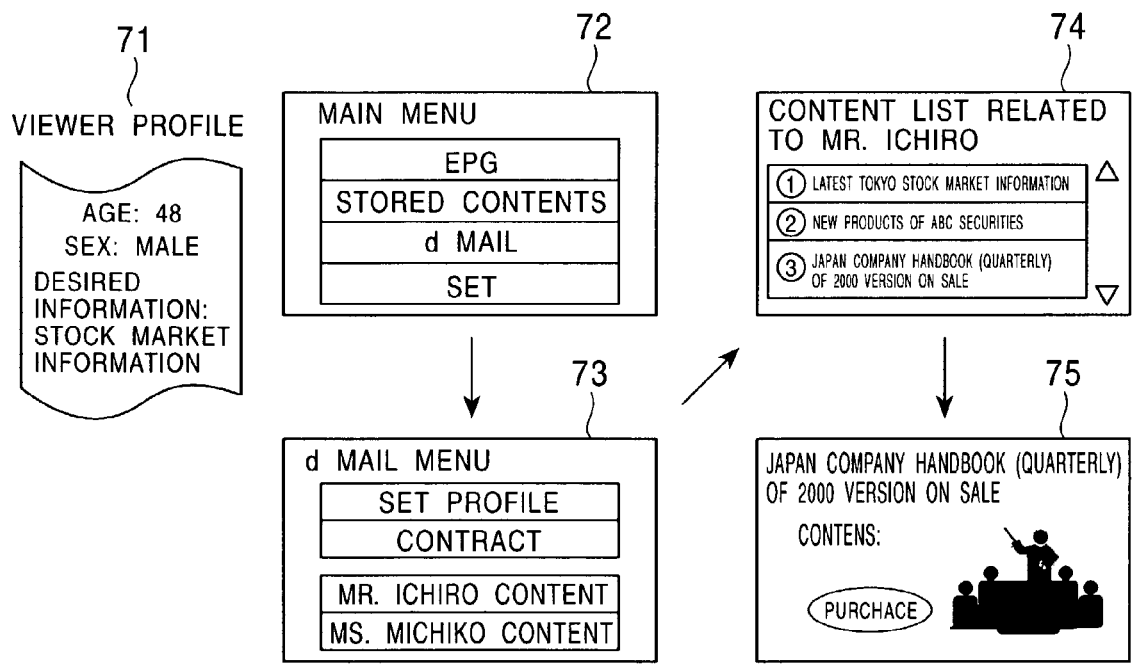
FIG. 6 is a schematic diagram of screens examples for the purpose of illustrating an example of an independent-type service according to the embodiment of the present invention.

Next, referring to FIG. 6, the outline of an independent-type management mode is described. FIG. 6 shows transitions of a television screen of a viewer. As an example, the viewer has input a viewer profile such as that indicated by reference numeral 71, and this profile information 71 is recorded as a file in the storage device of the receiver 14. For example, profile information 71 indicating "age: 48, sex: male, desired information: stock market information" is set. In the case of the independent type mode, information content which is being broadcast is automatically received in a time slot such as at night without the viewer being aware, and filtering causes only information content matching the profile of the viewer to be stored in the storage device. Thereafter, it is possible for the viewer to browse the stored information content appropriate for the viewer at a desired time.

Reference numeral 72 denotes a main menu screen. On the main menu screen 72 of the receiver, the viewer selects d-mail, which is a service according to the present invention, at a desired time. This shifts to a menu screen 73 for d-mail, and the browsing of the information content which has arrived for the viewer is selected within the menu screen 73. It is shown that content of the d-mail service has been stored for the other family members other than the viewer himself/herself. As a result of the selection operation, a screen 74 of a list of information contents which have arrived for the viewer and has been stored is displayed. On the screen 74, a list of the titles of the information contents is shown, and it is possible for the viewer to browse information content 75 selected from the list.

Figure 7:
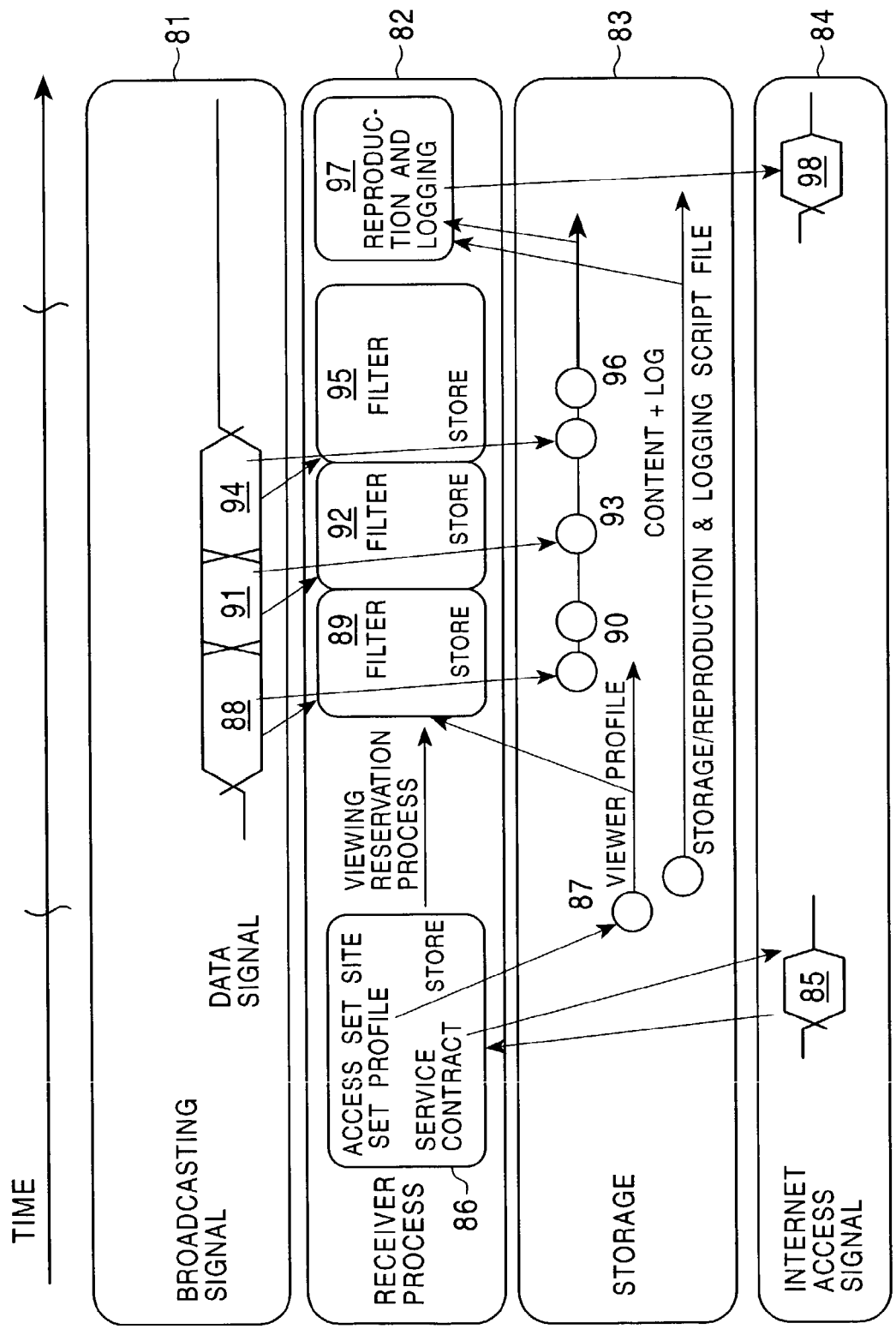
FIG. 7 is a schematic diagram showing processes over time for the purpose of illustrating an example of an independent-type service according to the embodiment of the present invention.

As a method of realizing the above-described independent type, two methods are possible. FIG. 7 shows a transmission signal and a receiver process over time in one of the methods. In FIG. 7, reference numeral 81 denotes a broadcast signal. Reference numeral 82 denotes processing within the receiver. Reference numeral 83 denotes a file within the storage device. Reference numeral 84 denotes an Internet access transaction. Furthermore, the passage of time is shown from the left to the right.

Initially, access is made to the viewer registration site 16 from the receiver 14. The transaction is indicated by reference numeral 85. The content for viewer registration is executed within the receiver 14, and as a result of inputting by the viewer, a viewer profile is set (receiver process 86). Then, the set viewer profile is sent to the viewer registration site 16, and at the same time, the viewer profile is recorded as a viewer profile file 87 in the storage device. Furthermore, a script for reproducing the stored content and uploading a viewing log is downloaded from the viewer registration site 16 and is stored as a file in the storage device.

Furthermore, the viewer makes a contract for automatic reception of the d-mail service at the viewer registration site 16. Programs of d-mail service have been set as the same series, and by performing a viewing reservation process of the series of d-mails, it becomes possible to receive the d-mail service, for example, in a time slot late at night every day, for example, 2:00 a.m. to 3:00 a.m. As a result, a series of registration processes allows periodic automatic reception of the d-mail service to be performed automatically.

More specifically, a broadcasting station repeatedly transmits a plurality of contents in a time slot indicated by reference numeral 88 by a data carousel method. The receiver performs automatic reception by the above-described viewing reservation function. As a result of executing a filtering and storing execution script received from the data carousel transmitted at the time slot 88, only the content filtered from a plurality of contents by a matching process is stored as a file 90 in the storage in a time slot indicated by reference numeral 89.

Furthermore, in this example, during the d-mail program, management is performed in such a way that the transmission of the data carousel is switched so as to transmit another content set in time slots indicated by reference numerals 91 and 94. In time slots indicated by reference numerals 92 and 95, different filtering and storing scripts are executed, and the filtered content at the respective time slots is stored as files 93 and 96 in the storage device.

Thereafter, the viewer reads and executes the script for reproducing the stored content and uploading a viewing log at a desired time, so that the viewer selects and views a desired content from the stored contents in a time slot indicated by reference numeral 97. Furthermore, for the viewed content, as indicated by a transaction 98, the ID information of the content is transmitted as a viewing log to the customer management/transaction center 17.

Figure 8:
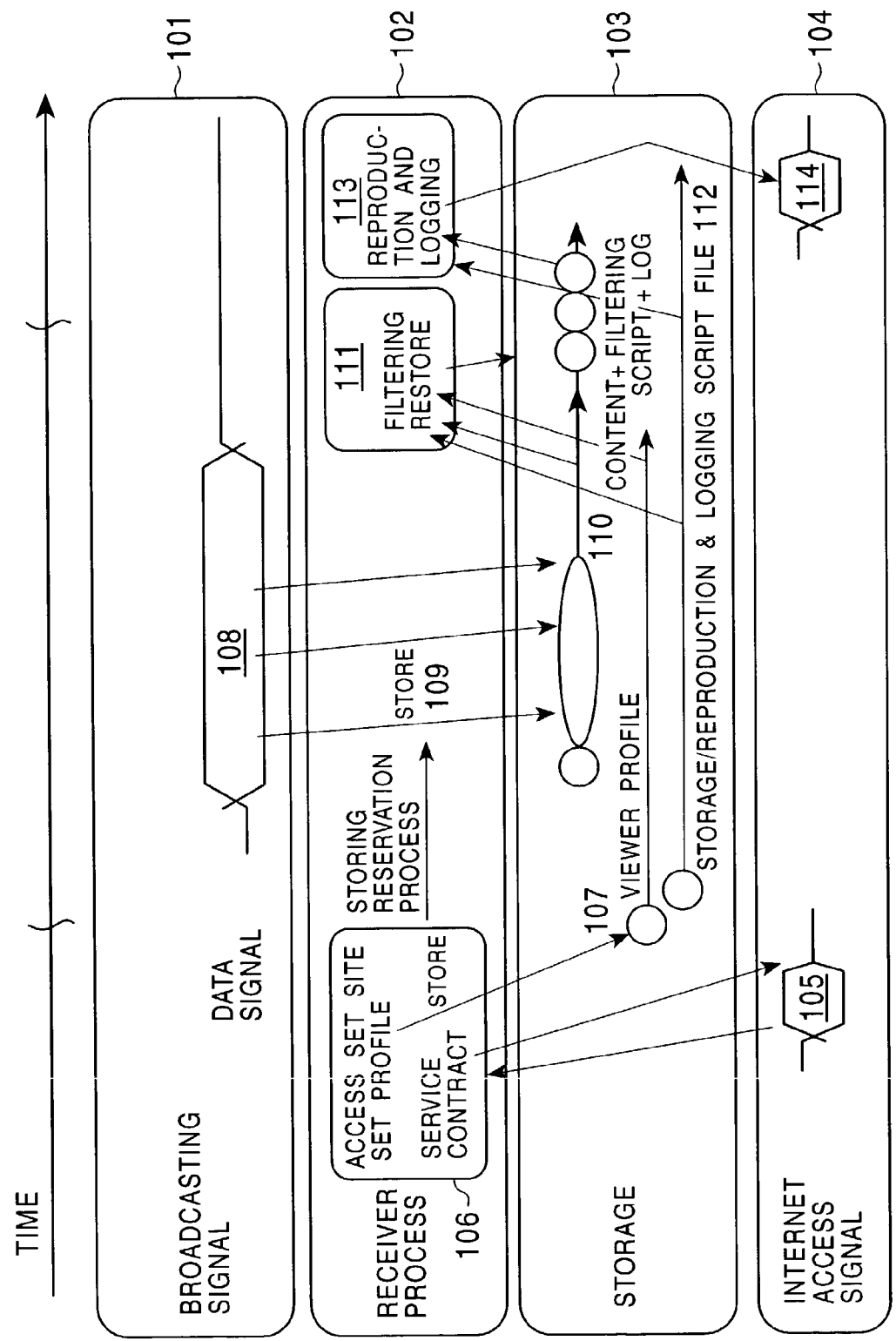
FIG. 8 is a schematic diagram of processes over time for the purpose of illustrating another example of an independent-type service according to the embodiment of the present invention.

FIG. 8 shows a transmission signal and a receiver process over time in another method of realizing an independent-type management. In FIG. 8, reference numeral 101 denotes a broadcast signal. Reference numeral 102 denotes processing within the receiver. Reference numeral 103 denotes a file within the storage device. Reference numeral 104 denotes an Internet access transaction. Furthermore, the passage of time is shown from the left to the right.

Initially, access is made to the viewer registration site 16 from the receiver 14. The transaction is indicated by reference numeral 105. The content for viewer registration is executed within the receiver 14, and as a result of inputting by the viewer, a viewer profile is set (receiver process 106). Then, the set viewer profile is sent to the viewer registration site 16, and at the same time, the viewer profile is recorded as a viewer profile file 107 in the storage device. Furthermore, a script for reproducing the stored content and uploading a viewing log is downloaded from the viewer registration site 16 and is stored as a file in the storage device.

Furthermore, the viewer makes a contract of automatic reception of the d-mail service at the viewer registration site 16. Programs of the d-mail service are set as the same series, and by performing a viewing reservation process of the series of d-mail, it becomes possible to receive and store the d-mail service, for example, in a time slot late at night every day, for example, 2:00 a.m. to 3:00 a.m. As a result, periodic automatic reception and automatic storage of d-mail service are performed automatically by a series of registration processes. Whereas in the above-described method shown in FIG. 7, a viewing reservation process is performed and the filtered content is stored, in the method shown in FIG. 8, a storing reservation process for storing all the received contents of the d-mail service is performed.

More specifically, a broadcasting station repeatedly transmits a plurality of contents in a time slot indicated by reference numeral 108 by a data carousel method. The receiver performs automatic reception and automatic storage by the above-described viewing reservation function, as indicated by reference numeral 109. As a result, a script file for filtering/restoring and all the information contents 110 which are broadcast are temporarily stored in the storage device.

Thereafter, when the viewer is going to browse content, a script file 112 for filtering/restoring is executed for a group of a plurality of contents 110. For example, on the main menu screen 72 of FIG. 6, when d-mail is selected, the script file 112 for filtering/restoring is executed. A process (a filtering/restoring process 111) of filtering content by the viewer profile 107 and restoring only content which have passed through a filter and of deleting content which have not passed through a filter is performed. At this point in time, as on the menu screen 73 (see FIG. 6) for d-mail, only information content matching the viewer profile 107 is displayed in a list, and the viewer selects the information content therein, so that the selected information content is reproduced (a reproduction and logging process). Furthermore, for the viewed (executed) content, the ID information of the content is transmitted as a transaction 114 to the customer management/transaction center 17.

In addition, another embodiment of the present invention will be described. The other embodiment is such that, as a result of filtering, after URL (Uniform Resource Locator) information indicating the location of the corresponding information content on the Internet is obtained, access is made to that location, so that the target information content is obtained and stored. For the other embodiment, management of both the linked type and the independent type of the above-described embodiment is possible. When it is desired to realize saving of the broadcasting bandwidth and to distribute much more information content, the other embodiment can be applied effectively to a case in which the viewer profile condition is very rare.

Figure 9:
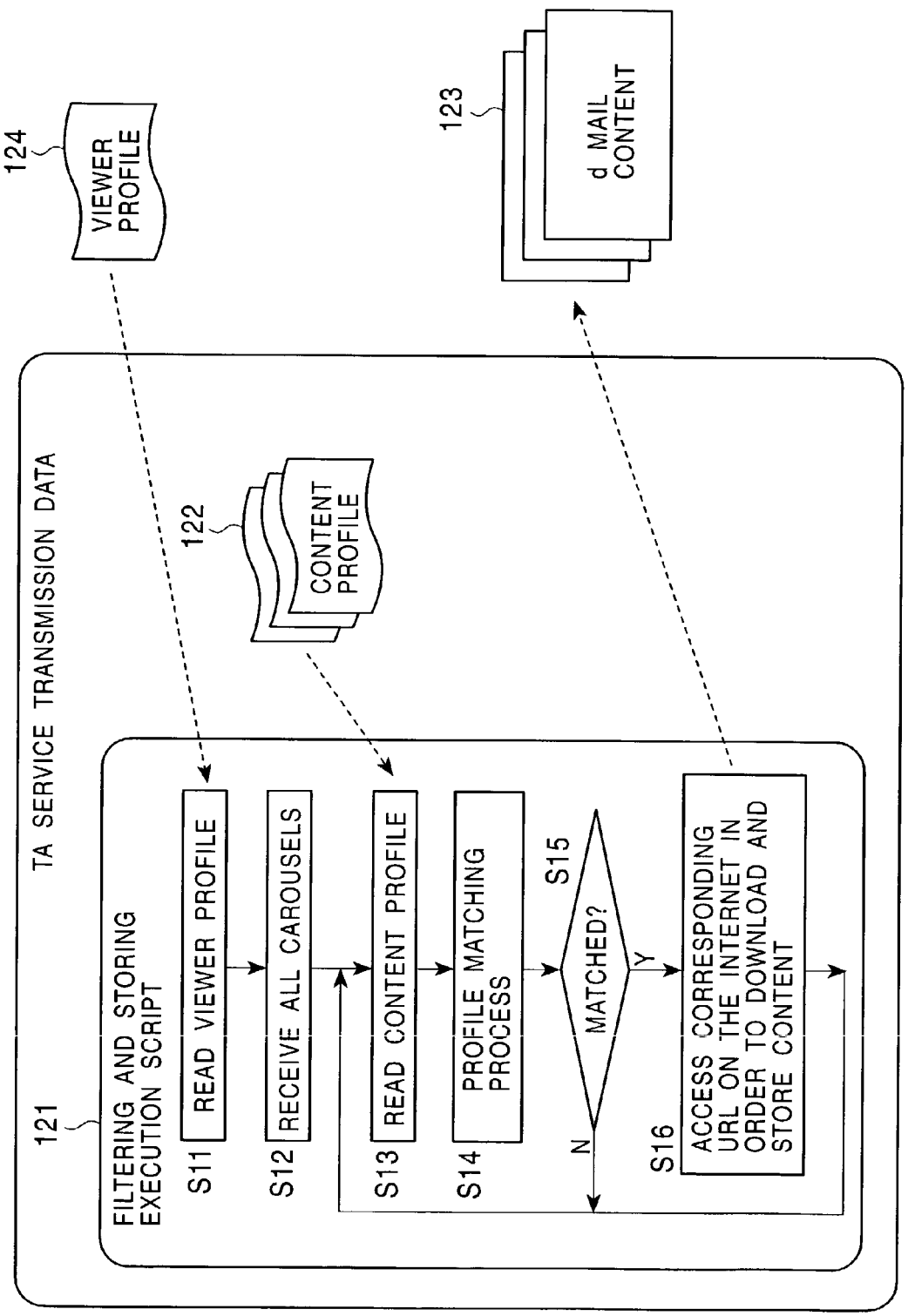
FIG. 9 is a flowchart illustrating transmission data and processes of a receiver according to another embodiment of the present invention.

FIG. 9 shows an operation sequence of a filtering and storing execution program 121 of the other embodiment in which Internet-linked management is performed. The receiver 14 receives a content profile 122 and a script file (filtering and storing execution script) 121. The content profile 122 includes profile information for each content and a URL for each content. Since the content itself does not need to be transmitted as broadcast waves, broadcast waves resources do not need be used. However, the other embodiment can be suitably applied to an environment in which always-on connections to the Internet are made.

The filtering and storing execution script file 121 is formed similarly to the script file 21, which is described above with reference to FIG. 2. That is, in the initial step S11, the viewer profile information 24 stored as a file in the nonvolatile memory or the hard disk within the receiver 14 is read. Next, all the content profiles 122 are temporarily downloaded into the cache area of the receiver (step S12). Then, the profile information 122 of the content is read (step S13), and in step S14, a process of matching the profile information 122 with the viewer profile information 124 is performed. In step S15, it is determined whether or not they match. When they do not match, the process returns to step S13 and when they match, the process proceeds to step S16.

In the process of FIG. 2, when they match, content is stored. In the process of FIG. 9, in step S16, the URL of a single or a plurality of d-mail contents on the Internet, described in association with content profile data, is obtained. Then, access is made to the obtained URL in sequence, and the corresponding d-mail content 123 on the Internet is downloaded and stored.

Figure 10:
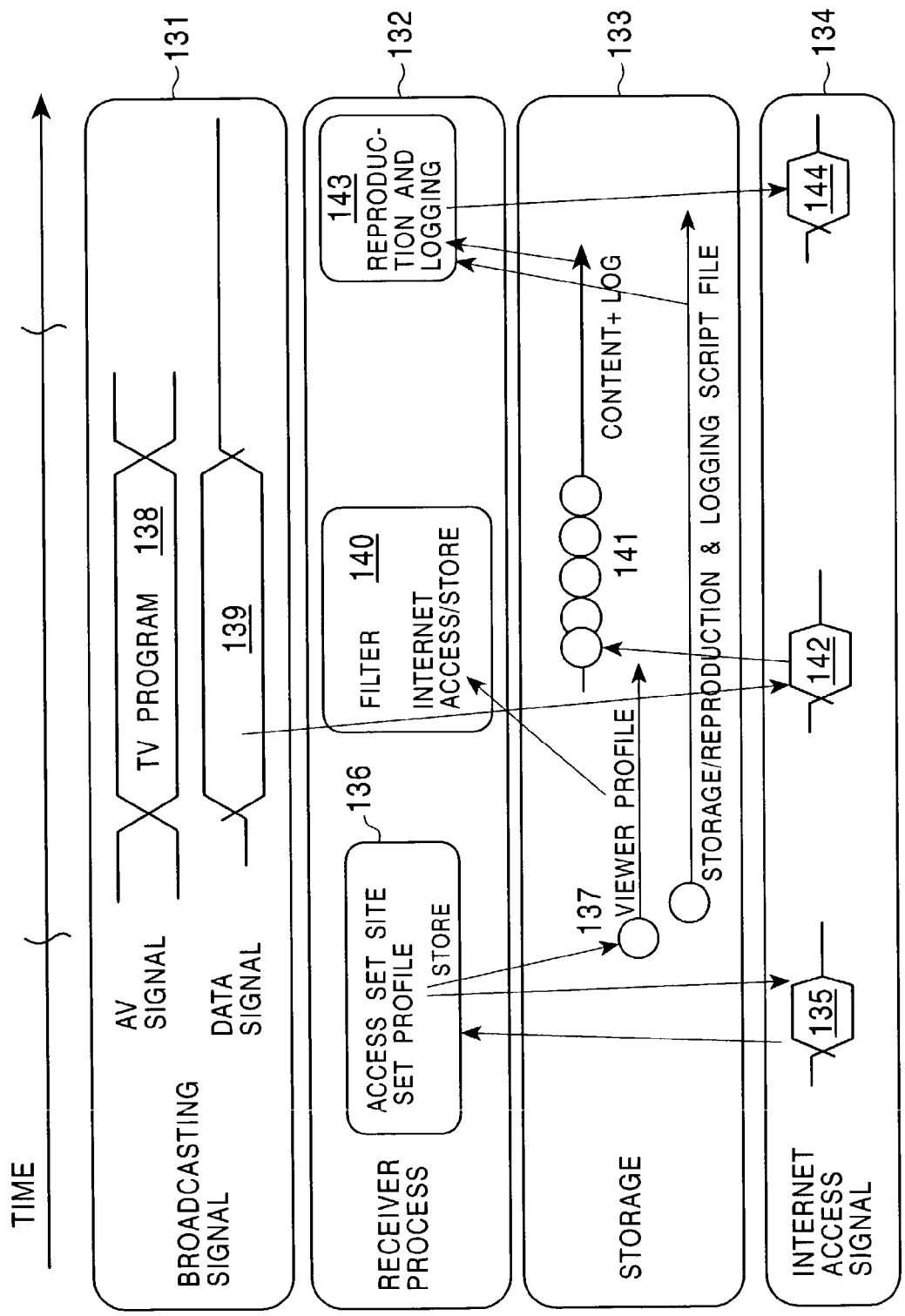
FIG. 10 is a schematic diagram showing processes over time for the purpose of illustrating an example of a linked-type service according to the other embodiment of the present invention.

FIG. 10 shows a transmission signal and processes over time in the other embodiment of the present invention, for example, in a linked-type management example. In FIG. 10, reference numeral 131 denotes a broadcast signal. Reference numeral 132 denotes processing within the receiver. Reference numeral 133 denotes a file within the storage device. Reference numeral 134 denotes an Internet access transaction. Furthermore, the passage of time is shown from the left to the right.

Initially, access is made to the viewer registration site 16 on the Internet from the receiver 14. The transaction is indicated by reference numeral 135. The content for viewer registration is executed within the receiver 14, and as a result of inputting by the viewer, a viewer profile is set (receiver process 136). Then, the set viewer profile is sent to the viewer registration site 16, and at the same time, the viewer profile is recorded as a viewer profile file 137 in the storage device. Furthermore, a script for reproducing the stored content and uploading a viewing log is downloaded from the viewer registration site 16 and is stored as a file in the storage device.

Thereafter, in a particular television program 138, content having a plurality of pieces of URL information is repeatedly transmitted in a time slot indicated by reference numeral 139 by a data carousel method. In the receiver, as a result of executing the filtering and storing execution script received from this data carousel, in a time slot indicated by reference numeral 140, only the URL list filtered by a matching process from the URL list information corresponding to the plurality of contents on the Internet is stored.

In addition, as indicated by the transaction 142, access is made to the stored URLs in sequence, and the obtained information content 141 is stored in sequence in the storage device. Thereafter, at a desired time, for example, in a time slot 143, the viewer reads and executes the script file for reproducing the stored content and uploading a viewing log, so that the viewer selects the desired content from the stored content, and the selected information content is reproduced. Furthermore, for the viewed (executed) content, the ID information of the content is transmitted as a transaction 144 to the customer management/transaction center 17.

The present invention is not limited to the embodiment of this invention described above, and various modifications and applications are possible within the spirit and scope of this invention. For example, the timing at which the content of the stored d-mail service is reproduced and the logging timing may be the same or may be different. Furthermore, although the filtering and storing execution script of FIG. 9 accesses a URL on the Internet when they match, all the matched contents (URLs) may be temporarily stored, and access may be made to the stored URLs in sequence in order to download the content. In addition, in addition to satellite broadcasts, broadcast networks such as digital terrestrial broadcasts and CATV, can be used. Furthermore, the information provider 11 and the broadcaster 12 may be the same. In a similar manner, the viewer registration site 16 and the customer management/transaction center 17 may be the same.

What is claimed is:

1. A receiving apparatus in an information distribution system made up of a customer management center and receiving apparatuses, which receive distributed content, including a content distribution apparatus and content storage means, said receiving apparatus comprising:

means for inputting viewer profile information in accordance with a viewer profile setting program, storing said input viewer profile information, and transmitting the viewer profile information to said customer management center;

means for receiving content, profile condition information of target viewers of said content, and a filtering and storing execution script;

means for executing sequentially:

first, for executing said filtering and storing execution script to perform matching of said stored viewer profile information with said profile condition information, and matched content is filtered and stored in said content storage means; and second, reading viewer profile information stored in the receiving apparatus;

third, temporarily downloading the content and content profile condition information; and means for reproducing said stored content, wherein said content, said profile condition information and said script file for the filtering and storing program are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

2. A receiving apparatus in an information distribution system made up of a customer management center and receiving apparatuses, which receive distributed content, including a content distribution apparatus and content storage means, said receiving apparatus comprising:

means for inputting viewer profile information in accordance with a viewer profile setting program, storing said input viewer profile information, and transmitting the viewer profile information to said customer management center;

means for receiving and storing content, profile condition information of target viewers of said content, and a filtering and storing execution script, and means for receiving content, profile condition information of target viewers of said content, and a filtering and storing execution script;

means for executing sequentially:

first, executing said filtering and storing execution script to perform matching of said stored viewer profile information with said profile condition information, and matched content is filtered and stored in said content storage means;

second, reading viewer profile information stored in the receiving apparatus;

third, temporarily downloading the content and content profile condition information; and means for reproducing said stored content wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

3. A receiving apparatus according to claim 1, wherein the content distribution apparatus comprises an information provider and a broadcaster which distributes the content and the profile condition information, which are received from said information provider by a broadcast.

4. A receiving apparatus according to claim 1, wherein, by reproducing the content stored in said content storage means, access is made to other content in a server which exists at a specific location on a communication network, which is described in said content, so that said other content is reproduced.

5. A receiving apparatus according to claim 1, wherein said viewer profile setting program is provided from said customer management center.

6. A receiving apparatus according to claim 1, wherein said receiving apparatus displays a list of names of the contents stored in said content storage means.

7. A receiving apparatus according to claim 1, wherein said receiving apparatus receives said profile condition information and said filtering and storing execution script, which are transmitted repeatedly at the same time as a broadcast program containing a video signal.

8. A receiving apparatus according to claim 7, wherein, when content stored on the basis of said matching in accordance with said filtering and storing execution script exists, a display for informing a viewer of the presence of the stored content is displayed on a reproduction screen of a broadcast program.

9. A receiving apparatus according to claim 1, further comprising an automatic receiving program for receiving distributions at a predetermined time, wherein, by executing said automatic receiving program, said profile condition information and the filtering and storing execution script are received.

10. A receiving apparatus according to claim 1, wherein, when said content stored in said content storage means is reproduced, information for identifying the content and reproduction log information containing a reproduction time are transmitted to said customer management center.

11. A receiving method in an information distribution system made up of a customer management center and receiving apparatuses, which receive distributed content, including a content distribution apparatus and content storage means, said receiving method comprising:

a step of inputting viewer profile information in accordance with a viewer profile setting execution script, storing said input viewer profile information, and transmitting the viewer profile information to said customer management center;

a step of receiving content, profile condition information of target viewers of said content, and a filtering and storing execution script;

sequentially performing a first step of executing said filtering and storing execution script to perform matching of said stored viewer profile information with said profile condition information, and matched content is filtered and stored in said content storage means;

then sequentially performing a second step of reading viewer profile information stored in the receiving apparatus;

then sequentially performing a third step of temporarily downloading the content and content profile condition information; and a step of reproducing said stored content, wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

12. A receiving method in an information distribution system made up of a customer management center and receiving apparatuses, which receive distributed content, including a content distribution apparatus and content storage means, said receiving method comprising:

a step of inputting viewer profile information in accordance with a viewer profile setting program, storing said input viewer profile information, and transmitting the viewer profile information to said customer management center;

a step of receiving and storing content, profile condition information of target viewers of said content, and a filtering and storing execution script;

sequentially performing a first step of executing said filtering and storing execution script to perform matching of said stored viewer profile information with said profile condition information, and matched content is filtered and stored in said content storage means;

then sequentially performing a second step of reading viewer profile information stored in the receiving apparatus;

then sequentially performing a third step of temporarily downloading the content and content profile condition information; and a step of reproducing said stored content, wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

13. An information distribution method in an information distribution system made up of a customer management center and receiving apparatuses, which receive apparatus and content storage means, said information distribution method comprising the steps of:

referring to viewer profile information which is input by a receiving apparatus and which is stored in the customer management center in order to set profile condition information so that target viewers for distributions are set; and distributing, to the receiving apparatus, content, said set profile condition information, and a filtering and storing execution script that, when executed, matches said viewer profile information with said profile condition information in the order of:

first, executing the filtering and storing execution script to match the viewer profile information with the profile condition information;

second, reading viewer profile information stored in the receiving apparatus;

third, temporarily downloading the content and content profile condition information, wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is broadcast together with the information content and the profile condition information.

14. An information distribution method in an information distribution system made up of a customer management center and receiving apparatuses, which receive distributed content, including a content distribution apparatus and content storage means, said information distribution method comprising:

a step in which the receiving apparatus inputs viewer profile information, stores said input viewer profile information, and transmits the viewer profile information to said customer management center;

a step in which said customer management center receives and stores the viewer profile information input by said receiving apparatus and provides the stored viewer profile information to a content distribution apparatus;

a step in which said content distribution apparatus sets profile condition information by referring to said provided viewer profile information in order to set target viewers for distributions, and distributes content, said set profile condition information, and a filtering and storing execution script;

a step in which said receiving apparatus receives content, said profile condition information, and said filtering and storing execution script;

sequentially performing a first step of executing said filtering and storing execution script to perform matching of said stored viewer profile information with said profile condition information, matched content is filtered and stored in the content storage;

then sequentially performing a second step of reading viewer profile information stored in the receiving apparatus;

then sequentially performing a third step of temporarily downloading the content and content profile condition information; and a step of reproducing the stored content, wherein said content, said profile condition information and said script file for the filtering and storing execution script are broadcast as a packet stream repeatedly transmitted in the time slot by a data carousel method, wherein said viewer profile information comprises a plurality of items which is be specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is broadcast together with the information content and the profile condition information.

15. An information distribution method in an information distribution system made up of a customer management center and receiving apparatuses, which receive distributed content, including a content distribution apparatus and content storage means, said information distribution method comprising:

a step in which the receiving apparatus inputs viewer profile information, stores said input viewer profile information, and transmits the viewer profile information to said customer management center;

a step in which said customer management center receives and stores the viewer profile information input by said receiving apparatus, and provides the stored viewer profile information to the content distribution apparatus;

a step in which said content distribution apparatus sets profile condition information by referring to said provided viewer profile information in order to set target viewers for distributions, and distributes content, said set profile condition information, and a filtering and storing execution script;

a step in which said receiving apparatus receives and stores content, said profile condition information, and said filtering and storing execution script;

sequentially performing a first step of executing said filtering and storing execution script to perform matching of said stored viewer profile information with said profile condition information, matched content within the stored content is filtered and stored in said content storage;

then sequentially performing a second step of reading viewer profile information stored in the receiving apparatus;

then sequentially performing a third step of temporarily downloading the content and content profile condition information; and a step of reproducing the stored content, wherein said content, said profile condition information and said script file for the filtering and storing execution script are broadcast as a packet stream repeatedly transmitted in the time slot by a data carousel method, wherein said viewer profile information comprises a plurality of items which is be specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is broadcast together with the information content and the profile condition information.

16. A computer-readable recording medium having recorded thereon a program executable by a processor for performing a method to cause filtering and storing by a computer of a receiving apparatus in an information distribution system made up of a customer management center and receiving apparatuses, which receive distributed content, including a content distribution apparatus and content storage means, said method comprising:

a step of receiving content and profile condition information of target viewers of said content, and a filtering and storing execution script;

a step of reading viewer profile information which is input in advance and stored;

sequentially performing a first step of executing said filtering and storing execution script to perform matching of said profile condition information with said viewer profile information;

then sequentially performing a second step of reading viewer profile information stored in the receiving apparatus;

then sequentially performing a third step of temporarily downloading the content and content profile condition information;

a step of determining the matching between the profile condition information and the viewer profile information; and a step of only storing the content in the content storage means when the profile condition information and the viewer profile information match and not storing the content when the profile condition information and the viewer profile information do not match, wherein said content, said profile condition information and said script file for the filtering and storing execution script are broadcast as a packet stream repeatedly transmitted in the time slot by a data carousel method, wherein said viewer profile information comprises a plurality of items which is be specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is broadcast together with the information content and the profile condition information.

17. The computer-readable recording medium according to claim 16, further comprising a step of reproducing content stored in said content storage means so that another content on a server, which exists at a specific location on a communication network, described in said content is accessed, and said other content is stored or reproduced.

18. A computer-readable recording medium having recorded thereon a program executable by a processor for performing a method to cause filtering and storing by a computer of a receiving apparatus in an information distribution system made up of a customer management center and receiving apparatuses, which receive distributed content, including a content distribution apparatus and content storage means perform for each content, said method comprising:

a step of receiving content and profile condition information of target viewers of said content, and a filtering and storing execution script;

a step of reading the viewer profile information which is input in advance and stored;

sequentially performing a first step of executing said filtering and storing execution script to perform matching of said profile condition information with said viewer profile information then sequentially performing a second step of reading viewer profile information stored in the receiving apparatus;

then sequentially performing a third step of temporarily downloading the content and content profile condition information;

a step of only storing the content in the content storage means when the profile condition information and the viewer profile information match and not storing the content when the profile condition information and the viewer profile information do not match; and a step of accessing another content which exists at a specific location on a communication network, described in said content when they match and of storing or reproducing said other content, wherein said content, said profile condition information and said script file for the filtering and storing execution script are broadcast as a packet stream repeatedly transmitted in the time slot by a data carousel method, wherein said viewer profile information comprises a plurality of items which is be specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

19. A computer-readable recording medium having recorded thereon a filtering and storing execution script for making a computer of a receiving apparatus in an information distribution system made up of a customer management center and receiving apparatuses, which receive distributed content, including a content distribution apparatus and content storage means perform for each content:

a step of receiving content and profile condition information of target viewers of said content;

a step of reading the viewer profile information which is input in advance and stored;

sequentially performing a first step of executing said filtering and storing execution script to perform matching of said profile condition information with said viewer profile information;

then sequentially performing a second step of reading viewer profile information stored in the receiving apparatus;

then sequentially performing a third step of temporarily downloading the content and content profile condition information; and a step of only storing the content in the content storage means when the profile condition information and the viewer profile information match and not storing the content when the profile condition information and the viewer profile information do not match, wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed so as to determine matching according to the logical computation result, and wherein the filtering and storing execution script is received together with the information content and the profile condition information.

20. A computer-readable recording medium according to claim 19, further comprising a step of reproducing content stored in said content storage means so that another content on a server, which exists at a specific location on a communication network, described in said content is accessed, and said other content is stored or reproduced.

21. A computer-readable recording medium having recorded thereon a filtering and storing execution script for making a computer of a receiving apparatus in an information distribution system made up of a customer management center and receiving apparatuses, which receive distributed content, including a content distribution apparatus and content storage means perform for each content:

a step of receiving content and profile condition information of target viewers of said content;

a step of reading the viewer profile information which is input in advance and stored;

sequentially performing a first step of executing said filtering and storing execution script to perform matching of said profile condition information with said viewer profile information;

then sequentially performing a second step of reading viewer profile information stored in the receiving apparatus;

then sequentially performing a third step of temporarily downloading the content and content profile condition information; and a step of accessing another content which exists at a specific location on a communication network, described in said content when the profile condition information and the viewer profile information match and of storing or reproducing said other content, wherein said content, said profile condition information and said script file for the filtering and storing execution script are broadcast as a packet stream repeatedly transmitted in the time slot by a data carousel method, wherein said viewer profile information comprises a plurality of items which is specified by binary values for an applicable case and for a non-applicable case, as said profile condition information, a case matching said item of said viewer profile information is set to one of the binary values in such a manner as to have a one-to-one correspondence with each item of said viewer profile information, and a logical computation of said viewer profile information and said profile condition information is performed to determine matching according to the logical computation result, and wherein the filtering and storing execution script is received together with the information content and the profile condition information.

22. A receiving method in an information distribution system made up of a customer management center and receiving apparatuses, which receive distributed content, including a content distribution apparatus and content storage means, said receiving method comprising:

storing viewer profile information to the customer management center;

receiving content with profile condition information;

receiving, together with the content, a filtering and storing execution script;

sequentially first, executing the filtering and storing execution script to match the viewer profile information with the profile condition information;

then sequentially second, reading viewer profile information stored in the receiving apparatus;

then sequentially third, temporarily downloading the content and content profile condition information; and storing only received content having profile condition information matching the viewer profile information based upon the executed filtering and storage execution script, wherein the filtering and storing execution script is received together with the information content and the profile condition information.

* * * * *

UNITED STATES PATENT AND TRADEMARK OFFICE
CERTIFICATE OF CORRECTION

PATENT NO. : 7,657,267 B2  Page 1 of 1
APPLICATION NO. : 10/174666
DATED : February 2, 2010
INVENTOR(S) : Naohisa Kitazato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this

Twenty-eighth Day of December, 2010

David J. Kappos
*Director of the United States Patent and Trademark Office*